United States Patent
Jeong et al.

(10) Patent No.: US 9,749,494 B2
(45) Date of Patent: Aug. 29, 2017

(54) USER TERMINAL DEVICE FOR DISPLAYING AN OBJECT IMAGE IN WHICH A FEATURE PART CHANGES BASED ON IMAGE METADATA AND THE CONTROL METHOD THEREOF

(71) Applicant: SAMSUNG ELECTRONICS CO., LTD., Suwon-si (KR)

(72) Inventors: Jae-yun Jeong, Seongnam-si (KR); Sung-jin Kim, Suwon-si (KR); Yong-gyoo Kim, Seoul (KR); Sung-dae Cho, Yongin-si (KR); Ji-hwan Choe, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/326,001

(22) Filed: Jul. 8, 2014

(65) Prior Publication Data

US 2015/0029362 A1    Jan. 29, 2015

Related U.S. Application Data

(60) Provisional application No. 61/857,310, filed on Jul. 23, 2013.

(30) Foreign Application Priority Data

Nov. 26, 2013    (KR) ........................ 10-2013-0144795

(51) Int. Cl.
  *H04N 5/76*    (2006.01)
  *H04N 1/32*    (2006.01)
  *G06T 11/60*   (2006.01)

(52) U.S. Cl.
  CPC ......... *H04N 1/32128* (2013.01); *G06T 11/60* (2013.01); *H04N 2201/3245* (2013.01);
  (Continued)

(58) Field of Classification Search
  CPC .................................................. H04N 1/32128
  See application file for complete search history.

(56) References Cited

U.S. PATENT DOCUMENTS

| | | | |
|---|---|---|---|
| 5,826,234 A | 10/1998 | Lyberg | |
| 6,097,381 A | 8/2000 | Scott et al. | |

(Continued)

FOREIGN PATENT DOCUMENTS

| | | |
|---|---|---|
| JP | 10-097280 A | 4/1998 |
| JP | 2002-99295 A | 4/2002 |

(Continued)

OTHER PUBLICATIONS

Yeh et al; "An approach to automatic creation of cinemagraphs"; Oct. 29, 2012; Proceedings of the 20th ACM international conference on Multimedia; pp. 1153-1156.*

(Continued)

*Primary Examiner* — Gary C Vieaux
(74) *Attorney, Agent, or Firm* — Sughrue Mion, PLLC

(57) ABSTRACT

A user terminal apparatus is provided. The user terminal apparatus includes a camera unit configured to photograph an object, a controller configured to detect an object image from an image of the object photographed by the camera unit, generate image metadata used to change a feature part of the object image, and generate an image file by matching the object image with the image metadata, a storage configured to store the image file, and a display configured to, in response to selecting the image file, display the object image in which the feature part is changed based on the image metadata.

5 Claims, 13 Drawing Sheets

(52) U.S. Cl.
CPC ............... *H04N 2201/3261* (2013.01); *H04N 2201/3273* (2013.01)

(56) References Cited

U.S. PATENT DOCUMENTS

| | | | |
|---|---|---|---|
| 6,232,965 B1 | 5/2001 | Scott et al. | |
| 6,697,120 B1* | 2/2004 | Haisma | G06T 13/205 345/473 |
| 7,015,934 B2 | 3/2006 | Toyama et al. | |
| 7,109,993 B2 | 9/2006 | Peleg et al. | |
| 7,145,606 B2 | 12/2006 | Haisma et al. | |
| 8,503,767 B2* | 8/2013 | Sun | G06K 9/468 382/159 |
| 8,570,397 B2 | 10/2013 | Jeong et al. | |
| 8,712,160 B2* | 4/2014 | Bigioi | G06K 9/00221 382/190 |
| 2004/0068410 A1 | 4/2004 | Mohamed et al. | |
| 2004/0141093 A1 | 7/2004 | Haisma et al. | |
| 2005/0129324 A1* | 6/2005 | Lemke | H04N 1/387 382/254 |
| 2007/0061152 A1 | 3/2007 | Doi | |
| 2007/0171237 A1 | 7/2007 | Pinter | |
| 2007/0230794 A1* | 10/2007 | McAlpine | G06T 11/60 382/190 |
| 2010/0066840 A1* | 3/2010 | Asukai | G06T 5/50 348/207.1 |
| 2010/0082345 A1* | 4/2010 | Wang | G10L 13/00 704/260 |
| 2011/0279700 A1* | 11/2011 | Steinberg | G06K 9/00228 348/222.1 |
| 2012/0224077 A1 | 9/2012 | Imai et al. | |
| 2012/0257048 A1 | 10/2012 | Anabuki et al. | |
| 2013/0129141 A1 | 5/2013 | Wang et al. | |
| 2013/0129158 A1* | 5/2013 | Wang | G06K 9/00 382/118 |
| 2014/0111662 A1* | 4/2014 | Mashiah | G06T 13/80 348/220.1 |
| 2014/0341482 A1* | 11/2014 | Murphy-Chutorian | G06K 9/00677 382/284 |
| 2015/0242394 A1 | 8/2015 | Kim | |
| 2015/0324096 A1* | 11/2015 | Leblanc | G11B 27/034 715/720 |

FOREIGN PATENT DOCUMENTS

| | | |
|---|---|---|
| JP | 2005-039451 A | 2/2005 |
| JP | 2005-223513 A | 8/2005 |
| JP | 4011844 B2 | 11/2007 |
| JP | 2008-084213 A | 4/2008 |
| JP | 2008-225886 A | 9/2008 |
| JP | 2009-152650 A | 7/2009 |
| JP | 2009-290842 A | 12/2009 |
| JP | 2012-010240 A | 1/2012 |
| KR | 10-0395491 B1 | 8/2003 |
| KR | 10-2008-0090174 A | 10/2008 |
| KR | 10-1 031 291 B1 | 4/2011 |
| KR | 10-2012-0065758 A | 6/2012 |
| WO | 2008/060031 A1 | 5/2008 |

OTHER PUBLICATIONS

Tompkins et al; "Towards Moment Imagery: Automatic Cinemagraphs"; Nov. 16, 2011; Conference for Visual Media Production (CVMP) 2011; pp. 87-93.*
Yeh et al; "A Tool for Automatic Cinemagraphs"; Jan. 12, 2012; Proceedings of the 20th ACM international conference on Multimedia; pp. 1-2.*
Written Opinion dated Oct. 22, 2014 issued in International Application No. PCT/KR2014/005729 (PCT/ISA/237).
Communication dated Dec. 19, 2014 issued by the European Patent Office in counterpart International Application No. 14172224.9.
Communication dated Nov. 4, 2015, issued by the United States Patent and Trademark Office in counterpart U.S. Appl. No. 14/308,141.
Communication dated Nov. 23, 2015, issued by the European Patent Office in counterpart European Application No. 14172224.9.
"Galaxy S4: Camera Features—Drama Shot, Dual Shot, Sound & Shot", Online, Accessed Jun. 11, 2014, <http://www.samsung.com/uk/discover/mobile/galaxy-s4-a-life-companion/> 7 Pages total.
Thompkin, et al.; "Towards Moment Imagery: Automatic Cinemagraphs", 2011 Conference for Visual Media Production (CVMP), Nov. 2011, 7 Pages total.
Ly, "Cinemagraph on your Nokia Lumia 920 & Lumia 820", Online, Accessed Jun. 11, 2014, <http://conversations.nokia.com/2012/12/07/using-cinemagraph-on-your-nokia-lumia-920-and-lumia-82> 9 Pages total.
Huang, et al.; "Facial Action Transfer with Personalized Bilinear Regression", Proceedings of the 12th European Conference on Computer Vision, Oct. 2012, vol. 2, pp. 1-14.
Communication issued May 11, 2016, issued by the United States Patent and Trademark Office in counterpart U.S. Appl. No. 14/308,141.
Communication dated Sep. 22, 2016, issued by the United States Patent and Trademark Office in counterpart U.S. Appl. No. 14/308,141.
Communication issued Jan. 16, 2017, issued by the European Patent Office in counterpart European Patent Application No. 14172224.9.
Communication issued Jan. 30, 2017, issued by the Mexican Institute of Industrial Property for counterpart Mexican Patent Application No. MX/a/2016/000834.
Communication issued Feb. 9, 2017, issued by the European Patent Office in counterpart European Patent Application No. 14829479.6.

* cited by examiner

FIG. 10
Phoneme      Viseme
9-1 ~ [ a ]  ⟶ 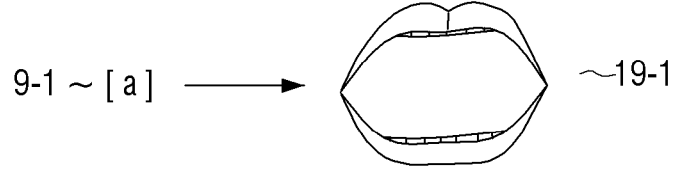 ~19-1
9-2 ~ [ e ]  ⟶ 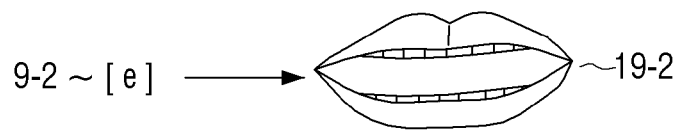 ~19-2
9-3 ~ [ i ]  ⟶ 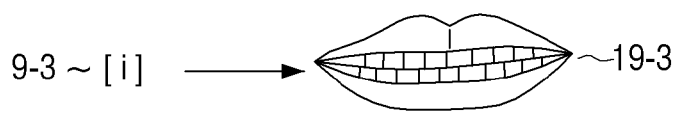 ~19-3
9-4 ~ [ o ]  ⟶ 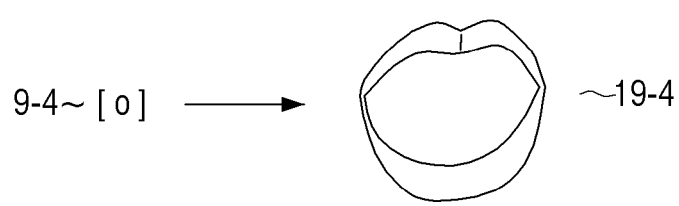 ~19-4
9-5 ~ [ u ]  ⟶ 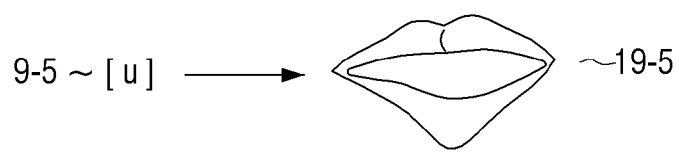 ~19-5

FIG. 11
9-6 ~ [ he- ]
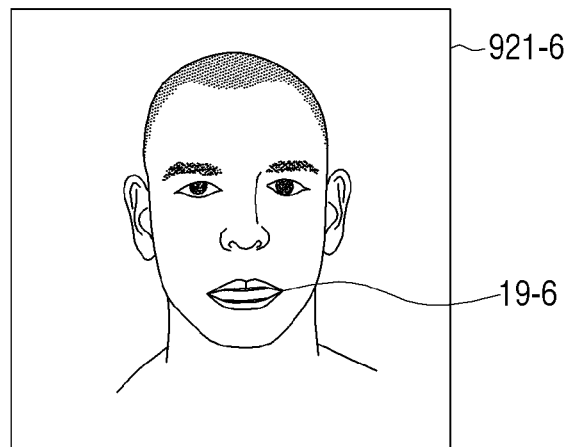
9-7 ~ [ lo- ]
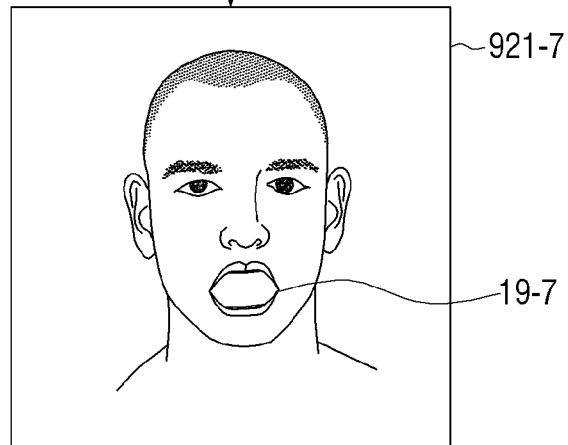
9-8 ~ [ u- ]
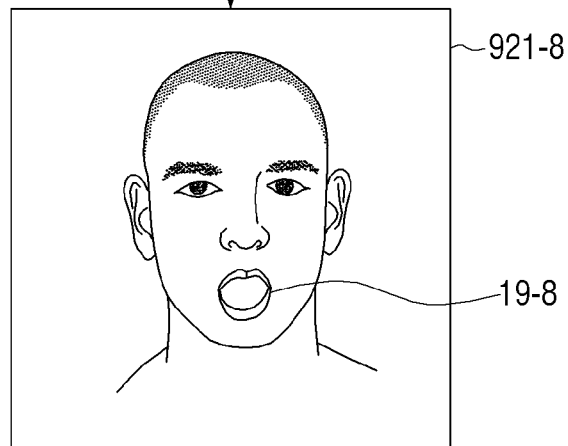

USER TERMINAL DEVICE FOR DISPLAYING AN OBJECT IMAGE IN WHICH A FEATURE PART CHANGES BASED ON IMAGE METADATA AND THE CONTROL METHOD THEREOF

CROSS-REFERENCE TO RELATED APPLICATIONS

This application claims priority from U.S. Provisional Application No. 61/857,310 filed on Jul. 23, 2013 in the United States Patent and Trademark Office, and Korean Patent Application No. 10-2013-0144795 filed on Nov. 26, 2013 in the Korean Intellectual Property Office, the disclosures of which are incorporated herein by reference in their entireties.

BACKGROUND

1. Field

Apparatuses and methods consistent with exemplary embodiments relate to a user terminal device, and more particularly, to a user terminal device which changes a part of a feature part of a user image and a method for controlling thereof.

2. Description of the Related Art

With development of electronic technologies, various portable terminals are is use. Most of the portable terminals which are available now are equipped with display means and photographing means, and have a photographing function. A portable terminal with a photographing function displays a live view through display means, by using light emitted through a lens. A user may perform photographing while viewing displayed live view.

While photographing is ordinarily performed in daily life, photographing is performed at various places, and a network system or an application which uses photos in various ways has been developed. As an example, users may upload the photos they photograph to a blog, web café, Social Network Service (SNS), or share them with others.

However, many users wish to photograph the users' own appearances with famous places as a background. In this case, if photographing and storing an image of the background which includes the users' appearance as a still image, the photos would not be realistic or vivid.

In this regard, a user photographs and stores a background image including the user's appearance as a moving image, but in this case, a stored moving image file is large in size, and thus requires a lot of space for storage.

Thus, there is a necessity to develop photographing technologies which enable a smaller size of photos, and make photos look more realistic and vivid.

SUMMARY

One or more exemplary embodiments provide a user terminal apparatus which displays an object image of a user image where a part of a feature part of the object or user automatically changes and a method of controlling thereof.

According to an aspect of an exemplary embodiment, there is provided a terminal apparatus which may include a camera unit configured to photograph an object, a controller configured to detect an object image from an image of the object photographed by the camera unit, generate image metadata used to change a feature part of the object image, and generate an image file by matching the object image with the image metadata, a storage configured to store the image file, and a display configured to, in response to selecting the image file, display the object image in which the feature part is changed based on the image metadata.

The controller may generate the image file by matching a background image with the object image and the image metadata, and, in response to the selecting the image file, display the background image to be overlapped with the object image.

In the above, the background image may be an image segmented from the photographed image or a pre-stored image.

The camera unit may obtain a plurality of images of the object by photographing the object at a plurality of time points, respectively, and the controller may compare the plurality of images of the object and detect the change in the feature part, and generate the image metadata in accordance with the change.

The camera may obtain a user moving image by photographing the user as a moving image, a moving image of the object by photographing the object as a moving image, and the controller may compare each frame of the moving image of the object and detect the change in the feature part, and generate the image metadata in accordance with the change.

The apparatus may further include a microphone unit configured to receive sound of the object when the object is photographed, and the controller, in response to the user voice being input, may generate the image metadata based on the sound when the sound is received at the microphone, convert the sound into sound metadata, and store the sound metadata in the image file in the storage.

The apparatus may further include a speaker unit configured to, in response to the selecting the image file, output the sound corresponding to the sound metadata.

The feature part may include a part of the object, and the image metadata may include coordinate data including a location of the feature part and a location moving state thereof.

The camera unit may include a first camera disposed in a first direction, and a second camera disposed in a second direction opposite to the first direction. The controller may detect the object image from a first image obtained from the first camera, select a second image obtained from the second camera as a background image, and generate the image file by matching the background image with the object image and the image metadata.

The storage may store information on at least one emoticon, and the controller, in response to selecting the emoticon, may generate the image metadata used to change the feature part of the object image based on the selected emoticon.

The controller, in response to selecting another image stored in the storage, may match the other image with the image metadata and store a result of the matching in the storage, and in response to selecting the result, display the other image on the display and changes a feature part of the other image based on the image metadata.

According to an aspect of an exemplary embodiment, there is provided a method for controlling a user terminal apparatus which may include: photographing an object; detecting an object image from a photographed image of the object; generating image metadata used to change a feature part of the object image; generating an image file by matching the object image with the image metadata; storing the image file; and, in response to selecting the image file, displaying the object image in which the feature part is changed based on the image metadata.

The generating the image file may include generating the image file by matching a background image with the object image and the image metadata, and the displaying the object image may include, in response to the selecting the image file, displaying the background image to be overlapped with the object image.

In the above, the background image may be an image segmented from the photographed image or a pre-stored image.

The photographing the user may include obtaining a plurality of object images by photographing the object at a plurality of time points, respectively. The detecting the object image may include detecting the change in the feature part by comparing the plurality of images of the object, and the generating the image metadata may include generating the image metadata in accordance with the change.

The photographing the object may include obtaining a moving image of the object by photographing the object as a moving image. The detecting the object image may include detecting the change in the feature part by comparing each frame of the moving image, and the generating the image metadata may include generating the image metadata in accordance with the change.

The method may further include: receiving sound or the object when the object is photographed; generating the image metadata based on the sound when the sound is received at the user terminal; converting the sound into sound metadata; and storing the sound metadata in the image file.

The method may further include, in response to the selecting the image file, outputting the sound corresponding to the sound metadata.

The feature part may include a part of the object, and the image metadata may include coordinate data including a location of the feature part and a location moving state thereof.

The method may further include: storing information on at least one emoticon, and the generating the image metadata may include, in response to selecting the emoticon, generating the image metadata used to change the feature part of the object image based on the selected emoticon.

The method may further include: in response to selecting another image stored in the user terminal; matching the other image with the image metadata and storing a result of the matching in the user terminal; in response to selecting the result, displaying the other image on the display; and changing a feature part of the other image based on the image metadata.

According to the aforementioned various exemplary embodiments, an object image where a feature part automatically changes may be provided, and thus the object image, which is small in size, vivid, and realistic, may be displayed.

BRIEF DESCRIPTION OF THE DRAWINGS

The above and/or other aspects will be more apparent by describing certain exemplary embodiments with reference to the accompanying drawings, in which:

FIG. 10 is a view provided to explain a process for detecting a mouth area according to an exemplary embodiment;

FIG. 11 is a view provided to explain a converted image according to an exemplary embodiment;

DETAILED DESCRIPTION

Figure 1:
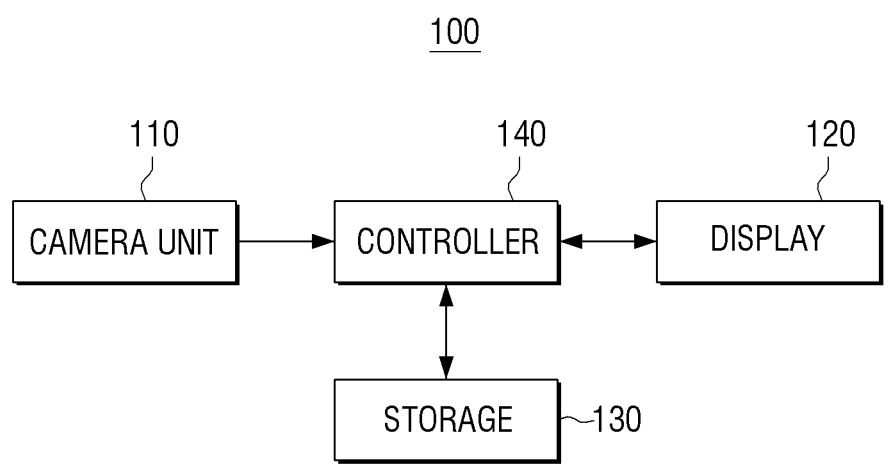
FIG. 1 is a block diagram illustrating a user terminal apparatus according to an exemplary embodiment.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of the exemplary embodiments. However, the exemplary embodiments may be practiced without those specifically defined matters. Also, well-known functions or constructions are not described in detail because they would obscure the application with unnecessary detail.

FIG. 1 is a block diagram illustrating a user terminal apparatus 100 according to an exemplary embodiment. The user terminal apparatus 100 according to the exemplary embodiment includes a camera unit 110, a display 120, a storage 130, and a controller 140.

The user terminal apparatus 100 may be implemented as various types of devices such as a cell phone, a smartphone, a tablet PC, a lap-top computer, a personal digital assistant (PDA), an MP3 player, a digital camera, a camcorder, etc.

The camera unit 110 is an element to execute a photographing operation. The camera unit 110 mounted on the user terminal apparatus 100 photographs an external image. In this case, the external image may be a still image or a moving image. In addition, the camera unit 110 may be implemented as a plurality of cameras such as a front camera mounted on a front part of the user terminal apparatus 100 and a rear camera mounted on a rear part of the user terminal apparatus 100.

The camera unit 110 includes a lens and an image sensor. Various types of a lens may be used such as a universal lens, a wide lens, and a zoom lens, which may be determined in accordance with a type, features, and environment for use of the user terminal apparatus 100. As to an image sensor, Complementary Metal Oxide Semiconductor (CMOS) and Charge Coupled Device (CCD) may be used.

The display 120 displays a live view obtained by the camera unit 110. A live view means an image provided to be viewed through the display 120, not a view finder. Specifically, light entered through a lens of the camera unit 110 is transmitted to an image sensor, and the image sensor transmits an electrical signal corresponding to entered light to the display 120. Accordingly, an image of a photographing subject within a range of photographing is displayed on a live view area. The live view may be provided in accordance with various methods such as a contrast Auto Focus (AF) live view method, phase difference AF live view method, a method for using a separate image sensor for handling live view, or the like.

The controller 140 controls overall operations of the user terminal apparatus 100.

To be specific, the controller 140 detects a background image from an image photographed by the camera unit 110. The controller 140 stores the background image in the storage 130. In this case, the background image may be a still image or a moving image.

The controller 140 detects a user image from an image photographed by the camera unit 110, and detects a still image of the user from the user image. The image from which the background image and the user image are detected may be the same image or different images. The still image of the user may be selected from various user images detected. In addition, the controller 140 may generate image metadata to be used to change at least one feature part of the user image. Here, the feature part may be a particular portion of the user shape, for example, a face, eyes, a mouth, ears, a nose, or so on of the user. The feature part may also be a voice of the user. This image metadata may be used to generate an image file. That is, by matching the user image with the image metadata, the controller 140 may generate an image file which includes a user image with a changed feature part.

The image metadata is data, which is extracted from the user image, and is to be added to a background image file. That is, the background image photographed by the camera unit 110 may be converted to an image file by the controller 140 and the controller 140 may generate image metadata from the user image photographed by the camera unit 110 and insert the image metadata to the converted image file. In other words, the controller 140 generates the image metadata of the user image and adds the image metadata to the background image file, instead of generating a separate file of a user image.

The image metadata may indicate movements or changes of at least one feature part of the user image. Accordingly, the image file may include background image data of the background image, user still image data of the still image of the user, and the image metadata.

The controller 140 may detect a user image from an image photographed by the camera unit 110, and detect a moving image of the user from the user image. In this case, the controller 140 may convert a part of the feature part such as the face or voice of the user included in the user moving image into image metadata, and store the image metadata. Therefore, the image metadata may be data which indicates movements or changes of the feature part among the user moving image, and an image file may include background image data of the background image, user moving image data of the moving image of the user, and the image metadata.

The controller 140 may generate the image file by matching the background image within the photographed image with the user image and the image metadata, and display the background image to be overlapped with the user image and a changed or changing feature part. Moreover, the controller 140 may generate an image file by matching a separately photographed background image with the user image and the image metadata. In this case, when a stored background image is a still image, the controller 140 may generate a still image file by matching the still image with the user image and the image metadata. When the stored background image is a moving image, the controller 140 may generate a moving image file by matching the moving image with the user image and the image metadata.

The storage 130 stores an image file generated by the controller 140. Accordingly, when a background image is a still image, the storage 130 stores a still image file, and when a background image is a moving image, the storage 130 stores a moving image file.

The display 120, in response to the image file stored in the storage 130 being selected, displays a corresponding image. That is, in response to the stored image file being selected, the display 120 displays a user image in which at least a part of a feature part is automatically changed according to image metadata.

The camera unit 110 may obtain a plurality of user images by photographing a user by a plurality of times. In this case, the controller 140 may compare the plurality of user images and detect a change in a feature part, and generate image metadata in accordance with the detected change state. Moreover, the camera unit 110 may obtain a user moving image by photographing a user as a moving image. In this case, the controller 140 may compare each frame of the user moving image, detect a change in a feature part, and generate image metadata in accordance with the detected change state.

Figure 2:
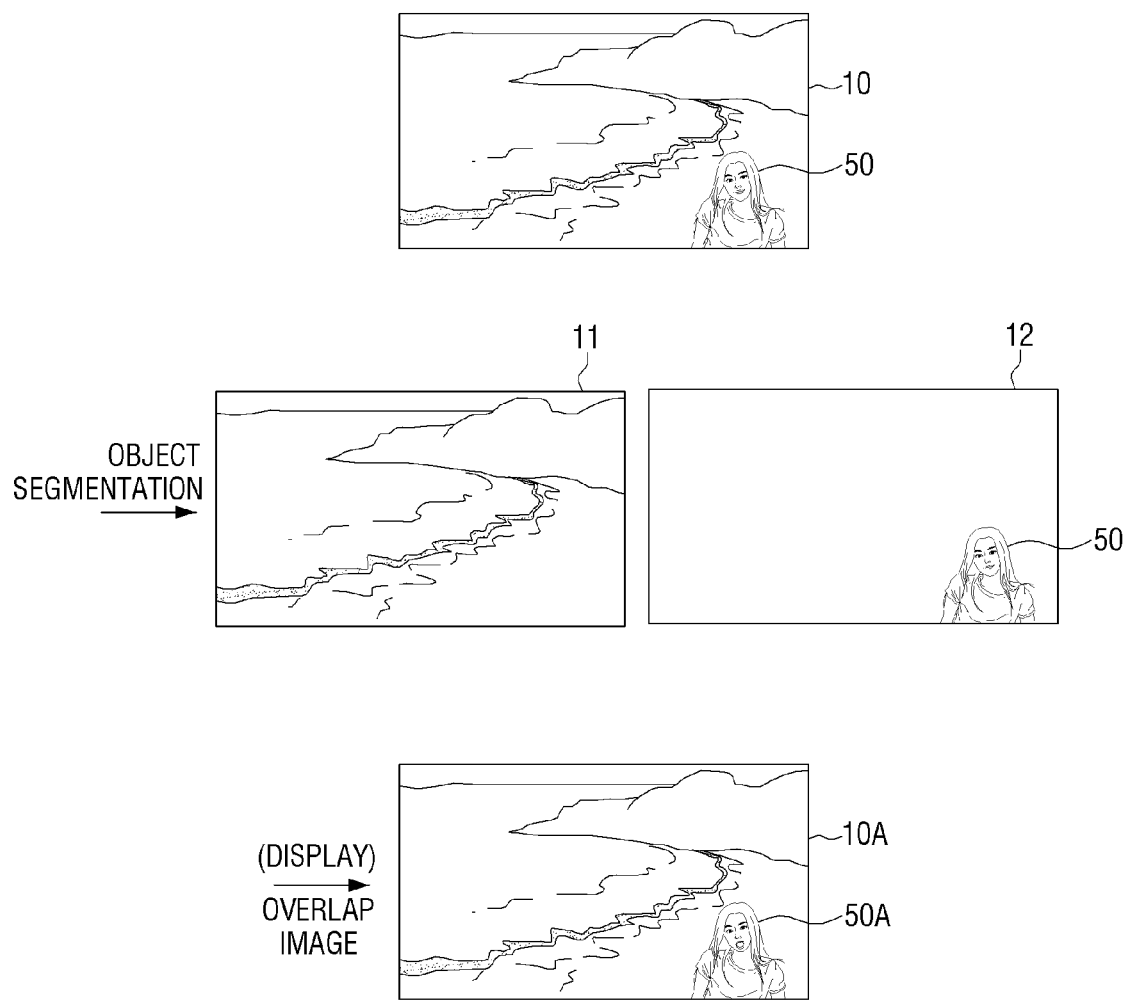
FIG. 2 is a view provided to explain image composition according to an exemplary embodiment.

FIG. 2 is a view provided to explain image composition according to an exemplary embodiment.

As illustrated in FIG. 2, a user may photograph an image through the user terminal apparatus 100, and in response to a photographing command being input, a photographing image including an object is obtained. In this case, the controller 140 activates the camera unit 110 and displays a live view image. An image photographed through the user terminal apparatus 100 may be a first image 10 including a first object 50. In this case, the first object 50 may be a user, and the first image 10 may be a background image 11 including the user.

The controller 140 may recognize the first object 50 included in the first image 10. Accordingly, when the first image 10 is photographed, the controller 140 segments the first object 50 from the photographed image. When the first object 50 is segmented from the photographed image, the first image 10 may be segmented into the background image 11 and the user image 12.

The controller 140, after converting the segmented background image 11 to background image data, may generate an image file. In this case, when the segmented background image 11 is a still image, the generated image file is a file related to a still image, and when the segmented background image 11 is a moving image, the generated image file is a file related to a moving image. Accordingly, the controller 140 may store the generated image file in the storage 130.

In addition, the controller 140 may detect a still image of the first object 50 from the segmented user image 12. The controller 140 may detect one of a plurality of image frames on the photographed first object 50 as a still image. Accordingly, the controller 140 may convert a still image on the first object 50 into still image data and store the still image data in the storage 130. In this case, the controller 140 may add the still image data to an image file. Accordingly, an image file may include the background image data and the still image data.

Moreover, the controller 140 may detect movement of at least one feature part of the first object 50 from the segmented user image 12. The controller 140 may convert the detected feature part of the first object 50 into image metadata. Accordingly, the controller 140 may convert the movements of the detected feature part the first object 50 into image metadata and store the image metadata in the storage 130. In this case, the controller 140 may add the image metadata to an image file. Accordingly, an image file may include the background image 11 data, the still image data, and the image metadata.

When the stored image file is selected, the controller 140 may decode the background image data, the still image data, and the image metadata included in the image file. Accordingly, when the image file is selected, a background image and a user image are displayed. In particular, since image metadata is decoded, a user image, though the user image is a still image, may indicate the second object 50A which is partially changed corresponding to the movement of the feature part of the first object 50 as a user image, as shown in an image 10A.

Figure 3:
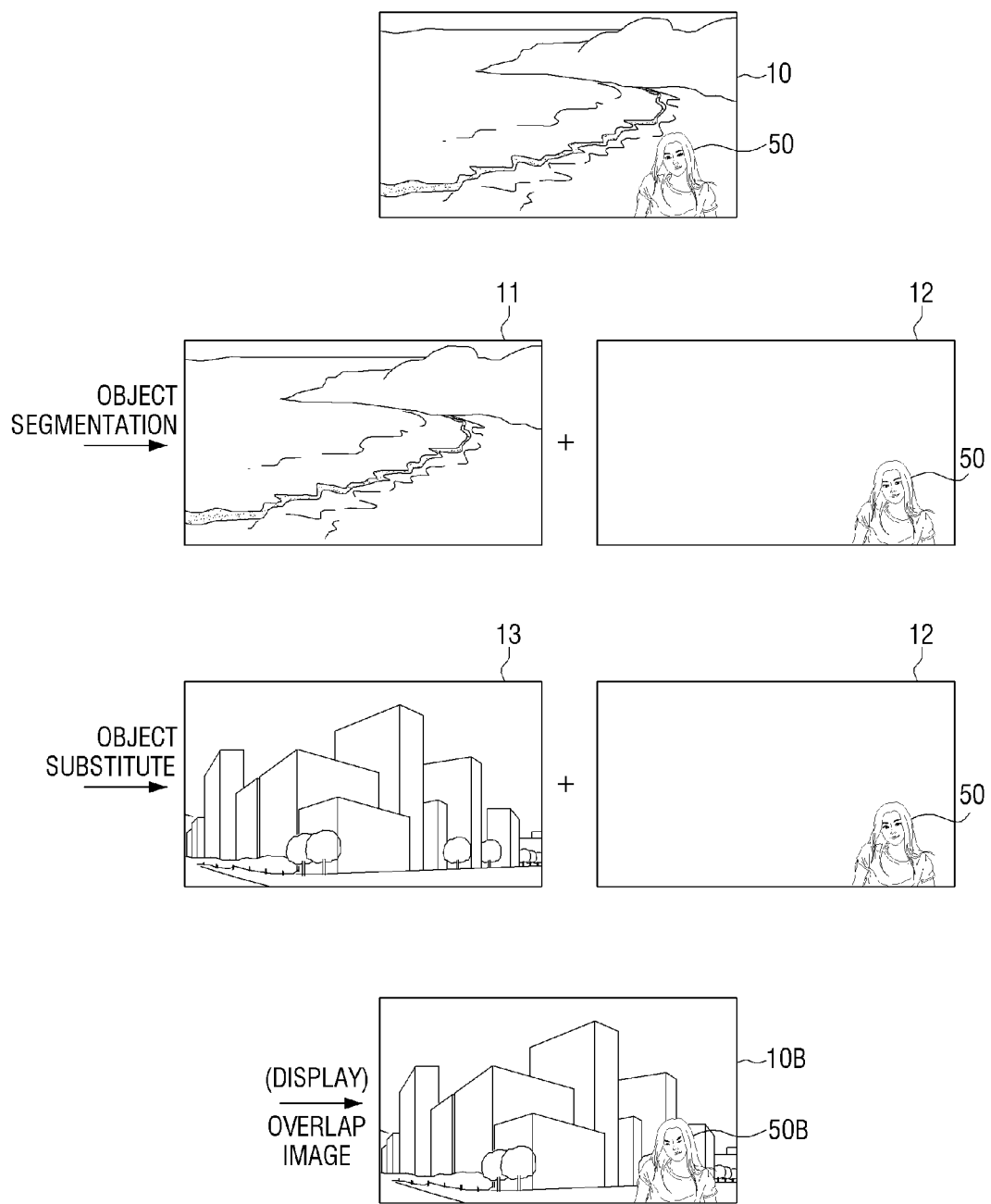
FIG. 3 is view provided to explain image composition according to another exemplary embodiment.

FIG. 3 is view provided to explain image composition according to another exemplary embodiment. Hereinbelow, the descriptions duplicated with FIG. 2 will be omitted.

As illustrated in FIG. 3, a user may photograph an image through the user terminal apparatus 100, and in response to the photographing command being input, a photographed image including an object is obtained. The controller 140 may recognize a first object 50 included in a first image 10, and segment the first object 50 from the photographed image. Accordingly, the first image 10 may be segmented into a first background image 11 and a user image 12. The controller 140 may, from the segmented user image 12, detect a still image of the first object 50, convert the still image of the first object 50 into still image data, and store the still image data in the storage 130. In addition, the controller 140 may detect movements of a feature part of the first object 50 from the segmented user image 12, and convert the movements of the feature part of the first object 50 into image metadata and store the image data in the storage 130.

As illustrated in FIG. 3, the controller 140 may substitute the first background image 11 with a second background image 13. Herein, the first background image 11 is a background image photographed through the camera unit 110, and the second background image 13 may be a background image pre-stored in a second background image file in the storage 130. Moreover, the first background image 11 is a background image photographed through a front camera of the user terminal apparatus 100, and the second background image 13 may be a background image photographed through a rear camera of the user terminal apparatus 100.

In this case, the controller 140 may add the still image data of the first object 50 and the image metadata of the first object 50 to the second background image file. Therefore, the second background image file may include the second background image data, the still image data of the first object 50, and the image metadata of the first object 50. The second background image file, to which the still image data and the image metadata are added, may be stored in the storage 130.

When the stored second background image file is selected, the controller 140 may decode the second background image data, the still image data, and the image metadata included in the second background image file. Therefore, when the second background image file is selected, the second background image and the user image are displayed. In particular, the image metadata is decoded, and thus, a user image, though it is a still image, may indicate the second object 50B, which is partially changed corresponding to the movements of the feature part of the first object 50, as a user image. Furthermore, the controller 140 may freely change a background image with respect to a user image, and thus the user terminal apparatus 100 may display an object along with various backgrounds.

Figure 4:
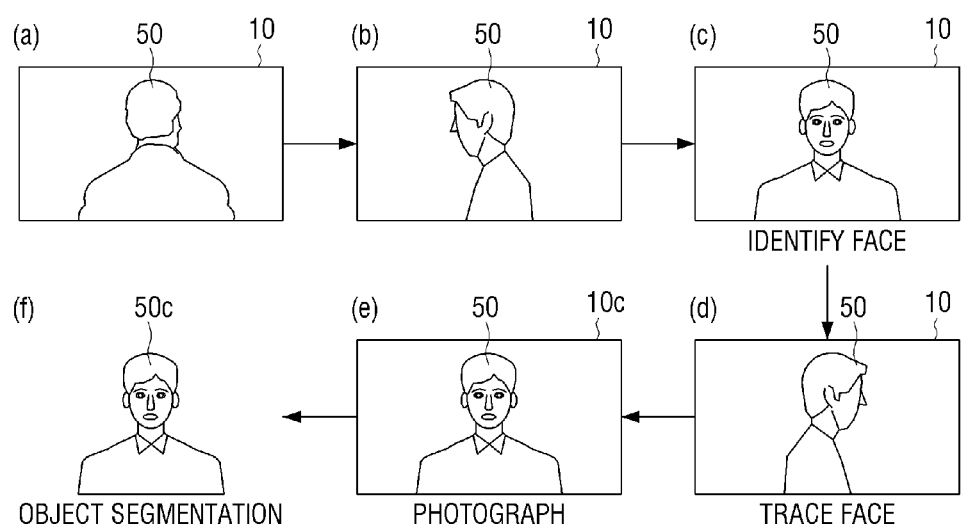
FIG. 4 is a view provided to explain a method for segmenting an object from a user image according to an exemplary embodiment.

The user terminal apparatus 100 according to still another exemplary embodiment may trace and segment an object based on a live view. FIG. 4 is a view provided to explain a method for segmenting an object according to an exemplary embodiment.

A user may photograph an image through the user terminal apparatus 100, and in response to a photographing command being input, a photographed image including an object is obtained. In this case, the controller 140 activates the camera unit 110 to display a live view. In the live view, an object corresponding to a subject for photography may be displayed.

The controller 140 observes the object by monitoring each frame of the live view. Specifically, the controller 140 extracts the live view in a frame unit, analyzes the frame, and detects an edge in the frame. The pixel areas, from among pixel areas which are segmented by the edge, which have similar pixel values and are disposed sequentially may be determined as one object.

However, when a size of a pixel area is less than a threshold value, determination of an object could be difficult. For example, as illustrated in FIG. 4(*a*), in the case when a user's back of the head is shown, or as illustrated in FIG. 4(*b*), in the case when a user's profile is shown, it may be hard to determine the face area. In this case, the controller 140 may keep monitoring the live view, until the face area may be determined.

As illustrated in FIG. 4(*c*), when a user turns the face in a front direction, a size of the face area is more than the threshold value, and thus the face area and the body area connected to the face area may be determined as one object. The controller 140, when an object is observed, even though the size of the observed object changes or moves, may keep tracing the object. Accordingly, as illustrated in FIG. 4(*d*), even though the face of a user moves in various directions, and thus the face type of the user changes, the controller 140 may determine the object correctly. When photographing is performed under this state, a photographed image as illustrated in FIG. 4(*e*) is obtained. And then, the controller 140 may segment the object from the photographed image.

Meanwhile, FIG. 4 describes a process of automatically segmenting an object, but the embodiment is not limited thereto. In other words, in order to improve a degree of precision, an exemplary embodiment where a user additionally adjusts an area for object segregation may be implemented.

Figure 5:
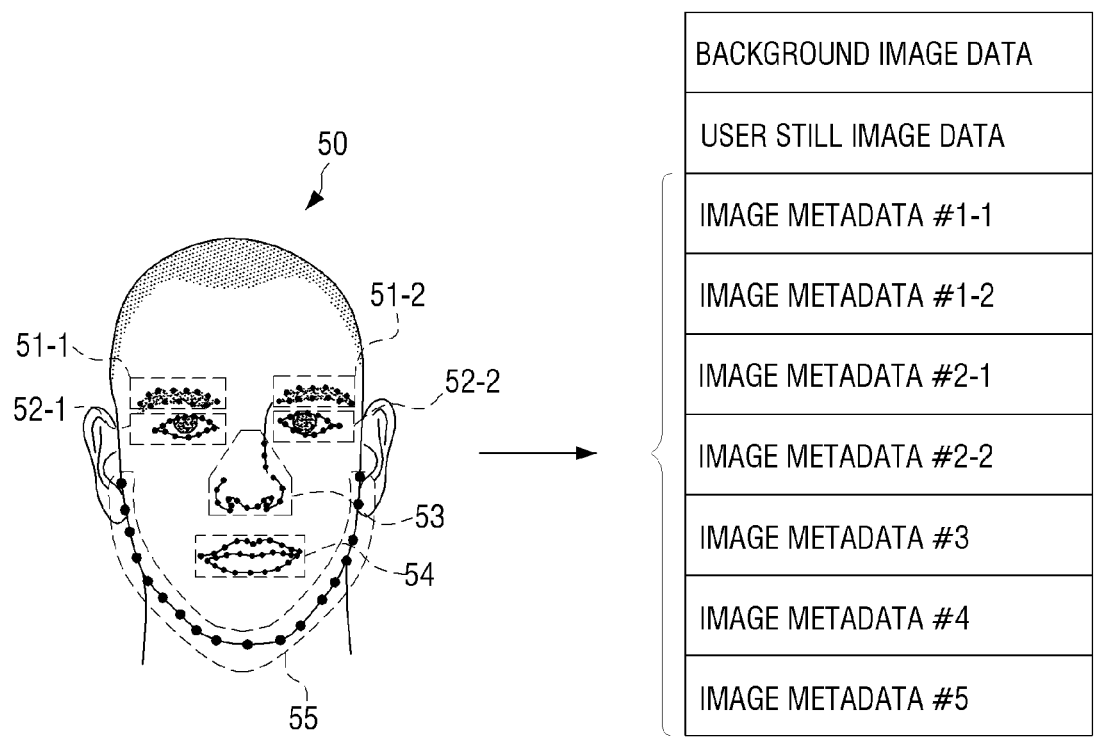
FIG. 5 is a view illustrating a feature part of a user image and a configuration of a still image file according to an exemplary embodiment.

FIG. 5 is a view illustrating a feature part of a user image and a configuration of a still image file according to an exemplary embodiment. FIG. 5 illustrates a face shape 50 of a user included in the user image.

The controller 140 detects the user image from a photographed image and a still image from the user image. A face shape 50 illustrated in FIG. 5 may be a still image of the user, and the still image may be converted into user still image data and inserted into an image file. In this case, background image data may have been inserted in the image file in advance.

The controller 140 may generate image metadata indicating a change in the face shape 50 through a live view on the user image. To do this, the controller 140 may extract at least one feature part on the face shape 50 of the user.

The image metadata may include coordinate data which indicates a location and a location moving state of each of at least one feature part. In addition, a plurality of reference points may be set on the feature part, and coordinate data of each of the plurality of reference points may be included in the image metadata.

As illustrated in FIG. 5, a feature part #1-1 (51-1) relates to the right eyebrow of the user, and coordinate data which indicates a location and a location moving state of each of a plurality of reference points included in the feature part #1-1 (51-1) is included in image metadata #1-1. A feature part #1-2 (51-2), a feature part #2-1 (52-1), a feature part #2-2 (52-2), a feature part #3 (53), a feature part #4 (54), and a feature part #5 (55) respectively relate to the left eyebrow, right eye, left eye, nose, mouth, and jaw line of the user. Moreover, coordinate data indicating a location and a location moving state of a plurality of reference points included in each feature part is included in the image metadata. The controller 140 inserts the image metadata into the image file.

In the image file, the background image data and the still image data are inserted, and thus, when the image file is selected, the user image is displayed on the background image. Moreover, in the image file, the image metadata is also inserted, and thus, in response to selection of the image file, a part of the plurality of feature parts of the user image, which is a still image, is automatically changed and displayed according to each metadata.

FIG. 5 illustrates seven feature parts on the face shape 50 coordinate data of which is included in the image metadata, but the embodiment is not limited thereto. According to an exemplary embodiment, other data of the feature parts may be additionally extracted and inserted into the image metadata. For example, the controller 140 may extract color and its change of the user face shape 50 as color data of the feature parts. The color data of the feature parts may include colors and color changes of the mouth, eyes, nose, lips, ears, cheeks, forehead, wrinkles, or so on of the user. Thus, the color data of the feature parts may be included in the image metadata. Thus, in response to selection of the image file, color-changed feature parts may be displayed.

Figure 6:
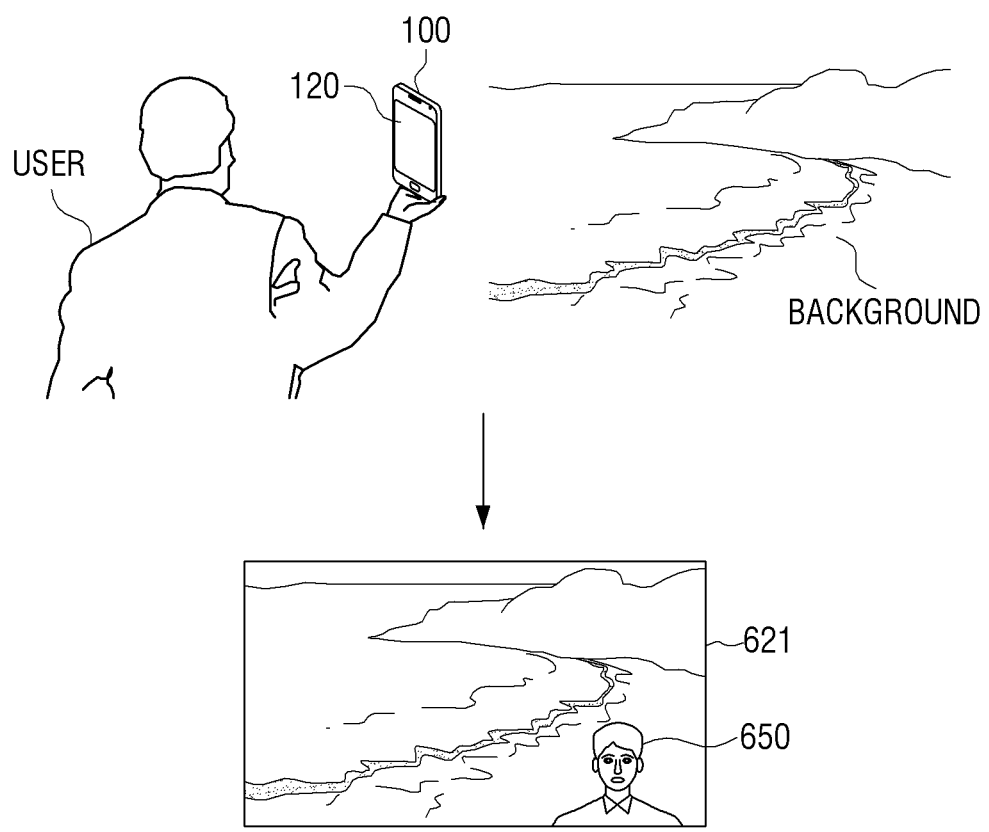
FIG. 6 is a view provided to explain image composition according to still another exemplary embodiment.

FIG. 6 is a view provided to explain a composited image 612 by using two cameras, according to an exemplary embodiment.

According to FIG. 6, the display 120 is disposed at one side of the user terminal apparatus 100. A first camera is disposed in the same side of the display 120, and a second camera is disposed on the opposite side of the display 120. In other words, the first camera may be a front camera disposed in the first direction, and the second camera may be a rear camera disposed in the second direction which is opposite to the first direction.

In case of photographing a composite image 621 which includes a background image and a user image, the background image and the user image may be photographed sequentially by one camera, if the user terminal apparatus 100 has only one camera. However, FIG. 6 illustrates an exemplary embodiment in which the first and second cameras photograph the background image as well as the user image simultaneously.

First of all, when the user turns on the first camera and the second camera, the controller 140 may display on the display 120 a live view of the first camera and a live view of the second camera concurrently. According to an exemplary embodiment, the live view of the first camera may be displayed on an upper screen of the display 120, and the live view of the second camera may be displayed on a lower screen of the display 120. According to another exemplary embodiment, the live view of the first camera may be displayed on a left screen of the display 120, and the live view of the second camera may be displayed on a right screen of the display 120. According to still another exemplary embodiment, the live view of the first camera and the live view of the second camera may be displayed as being overlapped to each other on one display screen. Accordingly, a user may perform photographing of the user and the background while seeing two live views concurrently.

And then, when a user begins photographing, the controller 140 controls the first camera and the second camera to photograph each image. That is, the first camera photographs a first image located in a first direction, and the second camera photographs a second image located in a second direction. In this case, the first image may include the user.

The controller 140, after detecting a user image 650 from the first image obtained through the first camera, segments the user image. In addition, the controller 140 may select the second image obtained through the second camera as the background image. Accordingly, the controller 140 may generate the user image 650 and a composite image 621 where the background image and the user image are included. In this case, the composite image 621 is generated by matching the user image with image metadata of the user as described earlier.

Figure 7:
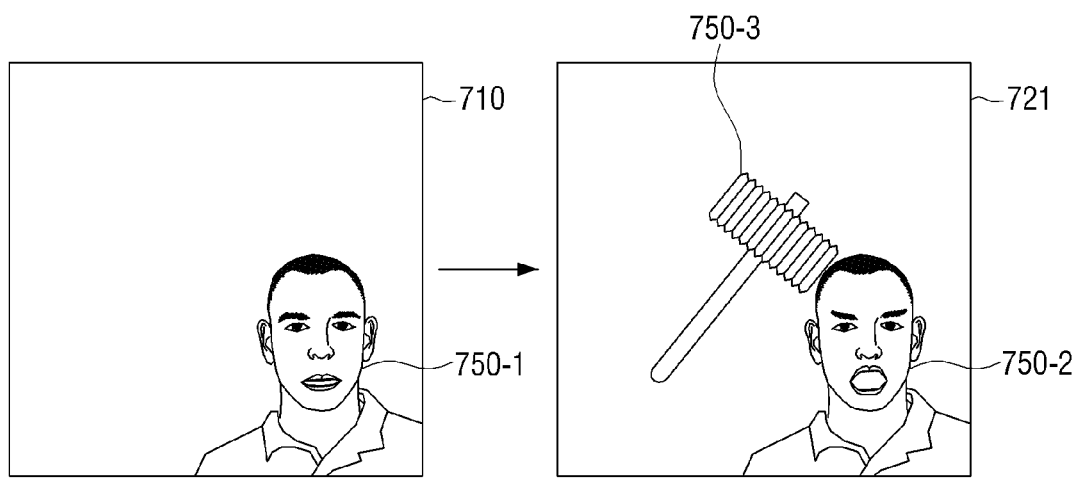
FIGS. 7 and 8 are views provided to explain a still image according to various exemplary embodiments.
Figure 8:
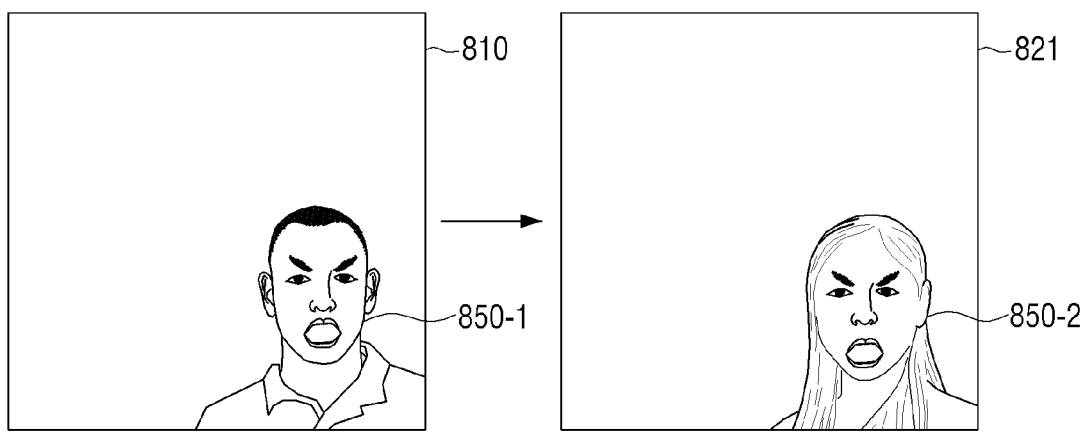

FIGS. 7 and 8 are views provided to explain a still image according to various exemplary embodiments.

Referring to FIG. 7, a first object 750-1 corresponding to a user shape is photographed through the user terminal apparatus 100, and a first image 710 is obtained. Herein, the storage 130 may have an emoticon file, including at least one emoticon 750-3, stored therein. The emoticon file may include predetermined image metadata. In this case, it is desirable that the image metadata included in the emoticon file is set to be related with the emoticon 750-3. According to FIG. 7, the emoticon 750-3 may be an image of a toy hammer, and the image data of the toy hammer may include coordinate data which indicates a location and a location moving state of a mouth of a human such as a user or the first object 750-1. For example, the coordinate data of the mouth of the human may include coordinate data of an open mouth of a user.

The storage 130 may also include a first image file (corresponding to the first image 710) which includes still image data of the first object 750-1 and image metadata of the first object 750-1. When the first image file is selected, the controller 140 may display a user image by decoding the still image data. In this state, when the emoticon 750-3 of the emoticon file is selected, the controller 140, while not decoding the image metadata included in the first image file, may generate the image metadata included in the emoticon file. That is, the controller 140 may generate the image metadata to change a feature part of the user image in accordance with selection of the emoticon 750-3.

Accordingly, as illustrated in right side of FIG. 7, the controller 140 decodes the still image data included in the first image file, and the still image of the first object 750-1 is displayed. In addition, the controller 140 generates and decodes the image metadata included in the emoticon file, and thus the feature part of the user image may be changed in part, i.e., a still image 750-2 is generated as shown an image 721, so as to correspond to the emoticon 750-3. That is, the controller 140 may display the still image of the first object 750-2 with his mouth open when the toy hammer image is overlapped with the still image of the first object 750-1.

According to an exemplary embodiment, the controller 140 may generate the emoticon file (corresponding to the image 721) which includes the still image data of the first object 750-1, the emoticon 750-3 and the image data, and, when the emoticon file is selected, the controller 140 may display the image 720-1 in the display 120.

FIG. 8 illustrates a state where a first object 850-1 corresponding to a user shape is photographed in an image 810 through the user terminal apparatus 100, and a first image file (corresponding to the image 810) including still image data of the first object 850-1 and image metadata is generated. Herein, the storage 130 may store at least one second image file (corresponding to an image 821) including still image data of a second object 850-2 as shown in the image 821. The second image file also includes image metadata. In this case, it is desirable that a type of the image metadata included in the second image file is set as the same as a type of the image metadata included in the first image file.

As described above, the first image file includes the still image data and image metadata of the first object 850-1. When the first image file is selected, the controller 140, by decoding the still image data, may display a user image, i.e., the first object 850-1. In this state, when the second image file is selected, the controller 140, while not decoding the still image data included in the first image file 810, may decode the still image data included in the second image file. In addition, the controller 140, at the same time with decoding the still image data of the second image file, may decode the image metadata included in the first image file.

Accordingly, as illustrated in the image 821 of FIG. 8, the controller 140 decodes the still image data included in the second image file, and thus, a still image of the second object 850-2 is displayed. In addition, the controller 140 decodes the image metadata included in the first image file, and thus, a feature part of the second object 850-2 may be changed at least in part in accordance with the image metadata included in the first image file.

For example, while the first image file includes the still image data and image metadata of the first object 850-1, a user may select the second image file. In this case, the second image file may be an image file stored in the storage or a new image file which is photographed by the camera unit 110 and generated accordingly. When a user selects the second image file, the controller 140 may decode the image metadata included in the first image file and the still image data included in the second image file. Accordingly, a change regarding facial expression of the first object 850-1, or the like may be applied to the second object 850-2, and then the image 821 is displayed.

Figure 9:
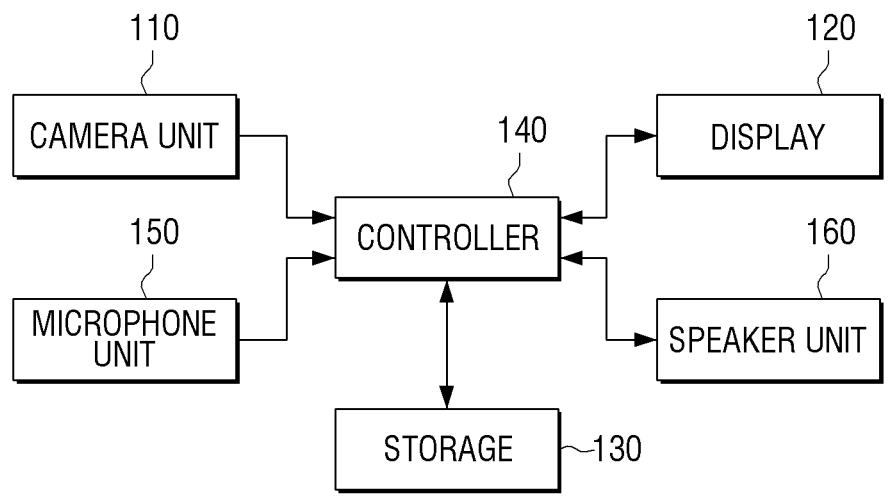
FIG. 9 is a block diagram illustrating a user terminal apparatus according to another exemplary embodiment.

FIG. 9 is an example of a block diagram illustrating the user terminal 100A according to another exemplary embodiment. Hereinafter, the descriptions duplicate with FIG. 1 will be omitted.

The user terminal apparatus 100A according to another exemplary embodiment may further include a microphone 150 and a speaker unit 160.

The microphone 150 is an element to receive a user voice or other sounds and convert them to audio data. The user voice may be input to the microphone 150 at the timing of photographing. The microphone 150 may be built in the user terminal apparatus 100A. In addition, the microphone 150 may adjust a volume of the input user voice by setting.

When the user voice is input to the microphone 150, the controller 140 may convert the input user voice to voice metadata or sound metadata. In this case, the controller 140 may generate the voice metadata based on the user voice.

Also, image metadata of the user may be generated based on the user voice by the controller 140 and stored along with the voice metadata in the storage 130. Descriptions about generating the voice metadata will be detailed in FIGS. 10-11.

When the input user voice is converted to the voice metadata, the controller 140 may store the voice metadata along with a still image file in the storage 130. In this case, the still image file may include a still image which is photographed by the camera unit 110 and generated at the timing of the user voice is input. Moreover, the still image file including the still image may be pre-stored in the storage 130. Accordingly, the controller 140 may include the voice metadata into the still image file.

The speaker unit 160 is an element which converts and outputs audio data to a user voice or other sounds. When the still image file is selected, the speaker unit 160 may decode voice metadata, and the controller 140 may generate the image metadata which corresponds to the voice metadata, and then decode the image metadata. Accordingly, when the still image file is selected, the speaker unit 160 outputs a user voice which corresponds to the voice metadata, and the controller 140 outputs a user image which corresponds to the voice metadata. Herein, the user image which corresponds to the voice metadata may include an image with a changed mouth shape in accordance with the voice metadata.

FIG. 10 is a view provided to explain a process for detecting a mouth area according to an exemplary embodiment.

In FIG. 10, phoneme and visual phoneme (viseme), which corresponds to the phoneme, are illustrated. The phoneme indicates a unit of sound which divides a meaning of a word and enables understanding of a divided word, and the visual phoneme (viseme) indicates an image describing a certain sound. For example, the visual phoneme may be an image of a mouth shape which corresponds to each phoneme.

The storage 130 may store phoneme and an image of a mouth shape which corresponds to the phoneme. Referring to FIG. 10, a phonetic alphabet [a] phoneme9-1 corresponds to a mouth shape 19-1 which pronounces [a], and the [a] phoneme9-1 and the image of the mouth shape of [a]19-1 are stored in the storage 130. Likewise, phonetic alphabets [e] phoneme9-2, [i] phoneme9-3, [o] phoneme9-4, and [u] phoneme9-5, and images of mouth shapes 19-2, 19-3, 19-4, 19-5 which correspond to each phonetic alphabet are stored in the storage 130.

The storage 130 may pre-store an image of a mouth shape, which corresponds to each phoneme, of an ordinary user. In this case, when an image of a mouth shape of a user is input to the camera unit 110, the controller 140 may generate a new image on a mouth shape by matching the input image with a mouth shape with phoneme, and the storage 130 may store a new image of the mouth shape. For example, while an image of a mouth shape of an ordinary user which is matched with [a] phoneme9-1 is pre-stored in the storage 130, when a user pronounces [a] phoneme9-1, the storage 130 may store therein an image of the user's mouth shape 19-1 which corresponds to [a] phoneme which the user pronounces, instead of the pre-stored image of the mouth shape of the ordinary user.

In addition, when phoneme which a user pronounces is input to the microphone 150, the controller 140 may detect an image of a mouth shape which matches with or corresponds to the input phoneme. For example, when a user pronounces [a] phoneme9-1, the controller 140 may detect an image of the mouth shape 19-1 which corresponds to [a] phoneme9-1. Hereinbelow, a method for changing a user image in part in accordance with phoneme which a user pronounces, and an image of a mouth shape which corresponds to phoneme will be detailed.

FIG. 11 is a view provided to explain a converted image according to an exemplary embodiment. FIG. 11 illustrates a process of sequentially changing an image of a mouth shape included in a user image in accordance with a sound "hello" which a user pronounces.

The microphone 150 receives the sound "hello" which the user pronounces. As illustrated in FIG. 11, the controller 140 divides the sound "hello" into [he-] phoneme9-6, [lo-] phoneme9-7, and [u-] phoneme9-8. The controller 140 generates voice metadata which corresponds to each of the divided three phonemes 9-6, 9-7, 9-8 and store the voice metadata in the storage 130.

The controller 140 may generate image metadata which corresponds to each voice metadata. The image metadata may be metadata which relates to an image of a mouth shape that corresponds to phoneme which the user pronounces. Accordingly, an image of a [he-] mouth shape 19-6 which corresponds to the [he-] phoneme 9-6, an image of a [lo-] 19-7 which corresponds to the [lo-] phoneme9-7[lo-], an image of a [u-] mouth shape 19-8 which corresponds to the [u-] phoneme 9-8 respectively may be generated as image metadata. The generated image metadata may be included in an image file and may be stored in the storage 130.

Each voice metadata may include a feature of sound, and the feature of sound may include tone, sound quality, high and low of sound, and so on. The feature of sound may be included in the voice metadata, and the image metadata may be generated to correspond to the feature of sound.

As described above, the voice metadata may be included in the image file along with background image data, user still image data, and image metadata. Accordingly, when the image file is selected, a background image is combined with a user image and displayed, in particular, an image of a mouth shape of the user is displayed in accordance with the image metadata generated to correspond to the voice metadata. That is, the first image 921-6 including the image of the mouth shape [he-] 19-6, the second image 921-7 including the image of the mouth shape [lo-] 19-7, and the third image 921-8 including the image of the mouth shape [u-] 19-8 are displayed in sequence. Accordingly, the user terminal apparatus 100, though the user image is a still image, may express the user image to be vivid and realistic.

Figure 12:
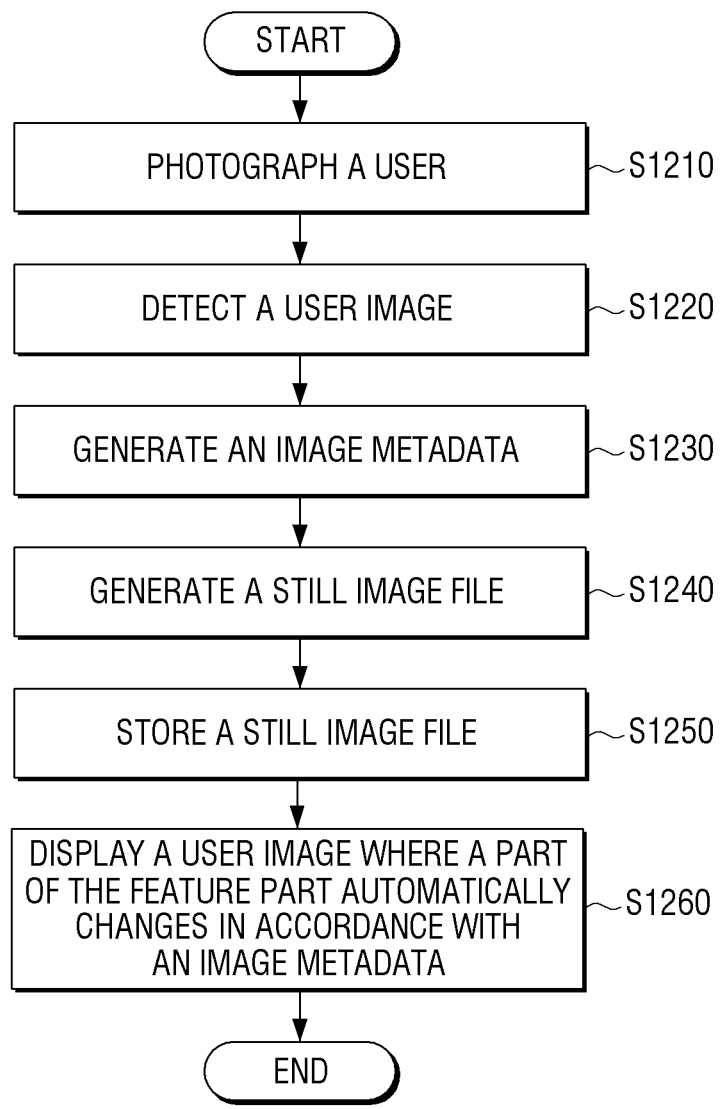
FIG. 12 is a flowchart of a method for controlling a user terminal apparatus according to an exemplary embodiment.

FIG. 12 is an example of a flowchart of a method for controlling the user terminal apparatus 100 or 100A according to an exemplary embodiment. Hereinbelow, the duplicate description will be omitted. With reference to FIG. 12, a method for controlling the user terminal apparatus 100 or 100A according to an exemplary embodiment is as described below.

The user terminal apparatus photographs a user (S1210). In this case, the user terminal apparatus, by using one camera, may photograph both a background and the user at the same time, and by using two cameras, may photograph both the background and the user at the same time. In addition, the user terminal apparatus may receive a user sound or other sound at the same time with photographing the user.

The user terminal apparatus detects a user image from the photographed image (S1220). The user image may be segmented from the photographed image. A background image may be segmented and converted to background image data and may be inserted into an image file. Moreover, a still image of the user image may be converted to user still image data and inserted into the image file. In this case, the image file may be a still image file. When a moving background image is used, a moving image file may be generated.

The user image may be converted to image metadata. Accordingly, the user terminal apparatus 100 may generate the image metadata used to change at least a part of a feature part of the user image (S1230). Also, the input user voice may be converted to voice metadata.

Accordingly, the image metadata and the voice metadata may be inserted into the image file along with the background image data and the user still image data. In this case, the image file may be generated by matching the user image with the image metadata (S1240). The user terminal apparatus may store the image file (S1250), and the image file may include the background image data, the user still image data, the image metadata, and the voice metadata.

And then, when the image file is selected, the user image in which at least a part of the feature part automatically changes in accordance with the image metadata may be displayed (S1260). That is, the displayed user image is a still image, but at least a part of the feature part of the user image is changed in accordance with the image metadata and displayed, and thus the user image may be expressed to be more vivid and realistic. Here, if the feature part is a mouth of the user, the user image may be displayed with corresponding voice or sound according to the voice metadata.

Figure 13:
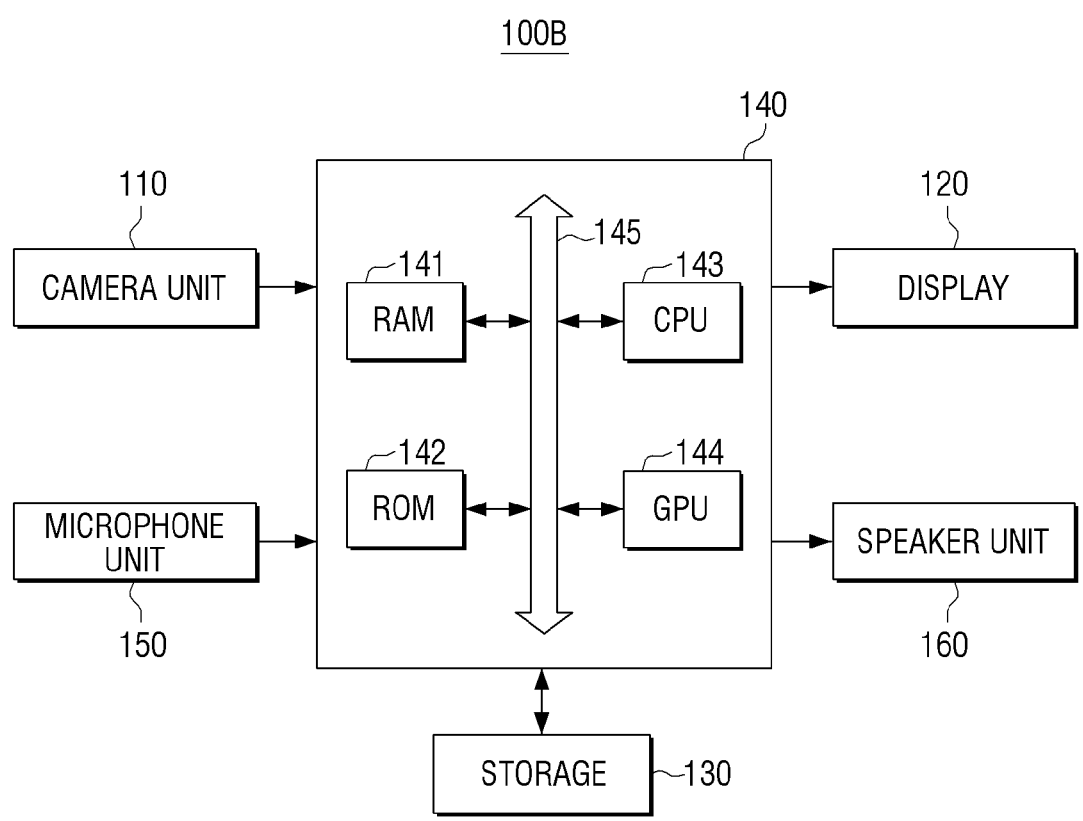
FIG. 13 is a block diagram provided to comprehensively explain the configuration of a user terminal apparatus according to still another exemplary embodiment.

FIG. 13 is a block diagram provided to comprehensively explain a configuration of the user terminal apparatus 100B according to still another exemplary embodiment.

FIG. 13 illustrates that a user terminal apparatus 100B includes the camera unit 110, the display 120, the storage 130, the controller 140, microphone 150, and the speaker unit 160 according to an exemplary embodiment.

The camera unit 110 is an element to perform photographing operation. The camera unit 110 which is provided on the user terminal apparatus 100B photographs an external image. In this case, an external image may be a still image or a moving image. The camera unit 110 may be implemented as a plurality of cameras such as a front camera mounted on a front side of the user terminal apparatus 100B and a rear camera mounted on a back side of the user terminal apparatus 100B.

The display 120 displays various images as described above. The display 120 may be implemented as various types of displays such as a liquid crystal display (LCD), organic light emitting diodes (OLED) display, a plasma display panel (PDP), or the like. In the display 120, a driving circuit, a backlight unit, etc. which may be implemented as a-si TFT, low temperature poly silicon (LTPS) TFT, organic TFT (OTFT), etc. may be included.

The display 120 may be implemented as an ordinary LCD display or a touch screen type. When implemented as a touch screen, a user may touch a screen and control the operations of the user terminal apparatus 100B.

A video processor (not illustrated) is an element to process various image data of an image file stored in the storage 130. That is, a video processor (not illustrated) may perform various image processing such as decoding, scaling, noise filtering, frame rate converting, resolution converting of image data, or the like. In this case, the display 120 may display an image frame generated in the video processor (not illustrated).

The microphone 150 is an element which receives a user voice or other sound and converts it to audio data. The microphone 150 may receive a user voice at the time of photographing. The microphone 150 may be embedded in the user terminal apparatus 100B. In addition, the microphone 150 may adjust a volume of an input user voice by setting.

When a user voice is input to the microphone 150, the controller 140 may convert the input user voice to voice metadata or sound metadata. In this case, the controller 140 may generate image metadata based on the user voice. Also, the image metadata generated based on the user voice may be stored in the storage 130.

The speaker unit 160 is an element which converts and output audio data into a user voice or other sound. When a still image file is selected, the speaker unit 160 may decode the voice metadata, and the controller 140 may generate and decode the image metadata which corresponds to the voice metadata. Accordingly, when the still image file is selected, the speaker unit 160 outputs the user voice which corresponds to the voice metadata, and the controller 140 outputs the user image which corresponds to the voice metadata.

An audio processor (not illustrated) is an element to process audio data stored in the storage 130. In this case, the audio data stored in the storage 130 may be user voice data and/or background audio data, or voice metadata of an image file. In the audio processor (not illustrated), various processing such as decoding, amplification, noise filtering of an audio data, etc., may be performed. Accordingly, the speaker unit 160 outputs audio data generated in the audio processor (not illustrated).

The storage 130 is an element to store various programs and data required for the operations of the user terminal apparatus 100B. The controller 140, by using various programs and data stored in the storage 130, controls overall operations of the user terminal apparatus 100B.

Further, the storage 130 stores an image file. To be specific, an image file may include background image data which corresponds to a background image included in a photographed image, user still image data which corresponds to a user image, image metadata which corresponds to a feature part of a user image, and voice metadata which corresponds to a user voice. The storage 130 may store an image file which includes various data.

The controller 140 controls overall operations of the user terminal apparatus 100B. The controller 140 includes a random-access memory (RAM) 141, a read-only memory (ROM) 142, a central processing unit (CPU) 143, a graphics processing unit (GPU) 144, and a BUS 145. The RAM 141, ROM 142, CPU 143, GPU 144, etc. may be interconnected to one another through the BUS 145.

The CPU 143, by accessing the storage 130, perform booting by using operating system (O/S) stored in the storage 130. The CPU performs various operations by using various programs, contents, and data stored in the storage 130. Moreover, the CPU 143 may execute an image file or a sound file stored in the storage 130. The image file and sound file have been described above, and will not be detailed further.

In the ROM 142, a command set and so on for system booting is stored. When a turn-on command is input and power is supplied, the CPU 143 copies the O/S stored in the storage 130 to the RAM 141 according to a command stored in the ROM 142, and executes the O/S to boot the system. When the booting is completed, the CPU 143 copies various programs stored in the storage 130 to the RAM 141, executes a program copied in the RAM 141, and performs various operations.

The GPU 144, when booting of the user terminal apparatus 100B is completed, displays a background image, a user image, etc. Specifically, the GPU 144 may generate a screen including various objects such as an icon, an image, and a text by using a calculator (not illustrated) and a rendering unit (not illustrated). The calculator (not illustrated) calculates attribute values such as a coordinate value which displays each object according to a layout of a screen, shape, size, color, etc. The rendering unit (not illustrated) generates a screen of various layouts including an object based on the attribute values calculated by the calculator (not illustrated). A screen generated in the rendering unit (not illustrated) is provided to the display 120, and displayed in a display area.

A method for controlling of a user terminal apparatus according to various exemplary embodiments as described above may be stored in a non-transitory readable medium. The non-transitory readable medium may be mounted on various apparatuses and used. For example, a program code for controlling a user terminal apparatus to perform photographing a user, detecting a user image from a photographed image, generating image metadata used to change a part of a feature part of the user image, generating a still image file by matching the user image with the image metadata, storing the still image file, and in response to selection of the still image file, displaying the user image where at least a part of the feature part automatically changes in accordance with the image metadata may be stored in the non-transitory readable medium and provided.

The non-transitory recordable medium refers to a medium which may store data semi-permanently rather than storing data for a short time such as a register, a cache, and a memory and may be readable by an apparatus. Specifically, the above-mentioned various applications or programs may be stored in a non-temporal recordable medium such as compact disc (CD), digital video disk (DVD), hard disk, Blu-ray disk, USB, memory card, and read-only memory (ROM) and provided therein.

The foregoing embodiments and advantages are merely exemplary and are not to be construed as limiting the inventive concept. The present teaching may be readily applied to other types of apparatuses. Also, the description of the exemplary embodiments of the inventive concept is intended to be illustrative, and not to limit the range of the claims, and many alternatives, modifications, and variations will be apparent to those skilled in the art.

What is claimed is:
1. A user terminal apparatus comprising:
   a display;
   a camera configured to obtain a plurality of images including an object by photographing the object at a plurality of time points, respectively; and
   a controller configured to identify the object from an image among the plurality of images, identify a movement of a feature part of the object by comparing the plurality of images, generate image metadata indicating the movement of the feature part of the object,
   wherein the controller, in response to receiving a user input for selecting other image, matches the other image with the image metadata, and in response to receiving a user input for selecting a result of the matching, displays the other image on the display and changes a feature part of the other image based on the image metadata.
2. The apparatus as claimed in claim 1, wherein the camera is configured to obtain a moving image of the object by photographing the object as a moving image, and
   wherein the controller is configured to compare each frame of the moving image of the object and identify a change in the feature part, and generate the image metadata in accordance with the change.

3. The apparatus as claimed in claim 1, wherein the feature part comprises a part of the object, and
wherein the image metadata comprises coordinate data including a location of the feature part and a location moving state thereof.

4. A method for controlling a user terminal apparatus, the method comprising:
obtaining a plurality of images including an object by photographing the object at a plurality of time points, respectively;
identifying the object from an image among the plurality of images;
identifying a movement of a feature part of the object by comparing the plurality of images;
generating image metadata indicating the movement of the feature part of the object;
matching, in response to receiving a user input for selecting other image, the other image with the image metadata; and
in response to receiving a user input for selecting a result of the matching, displaying the other image and changing a feature part of the other image based on the image metadata.

5. The method as claimed in claim 4, wherein the photographing the object comprises obtaining a moving image of the object by photographing the object as a moving image,
wherein the identifying the object comprises identifying the change in the feature part by comparing each frame of the moving image, and
wherein the generating the image metadata comprises generating the image metadata in accordance with the change.

* * * * *